March 23, 1965

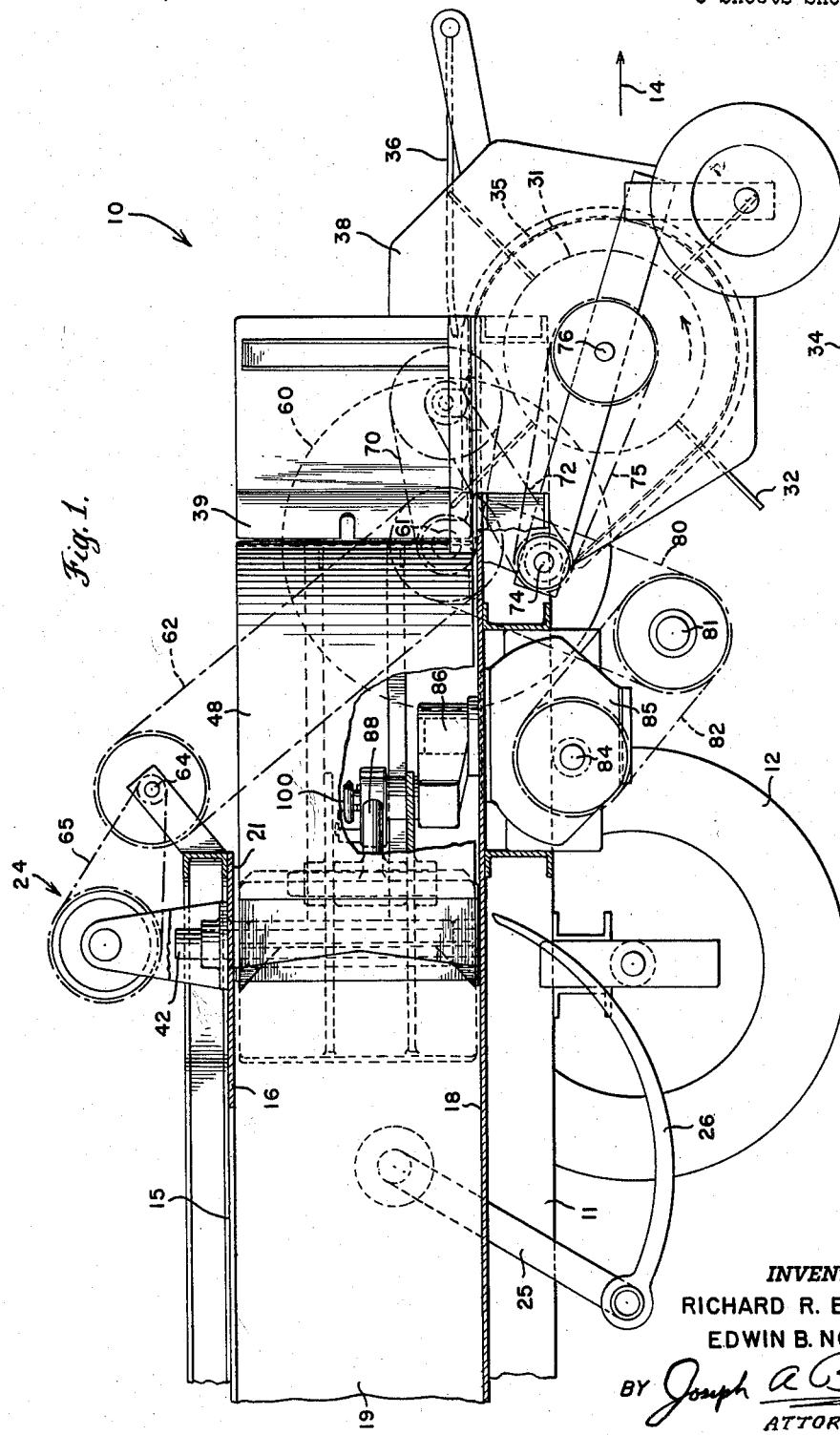

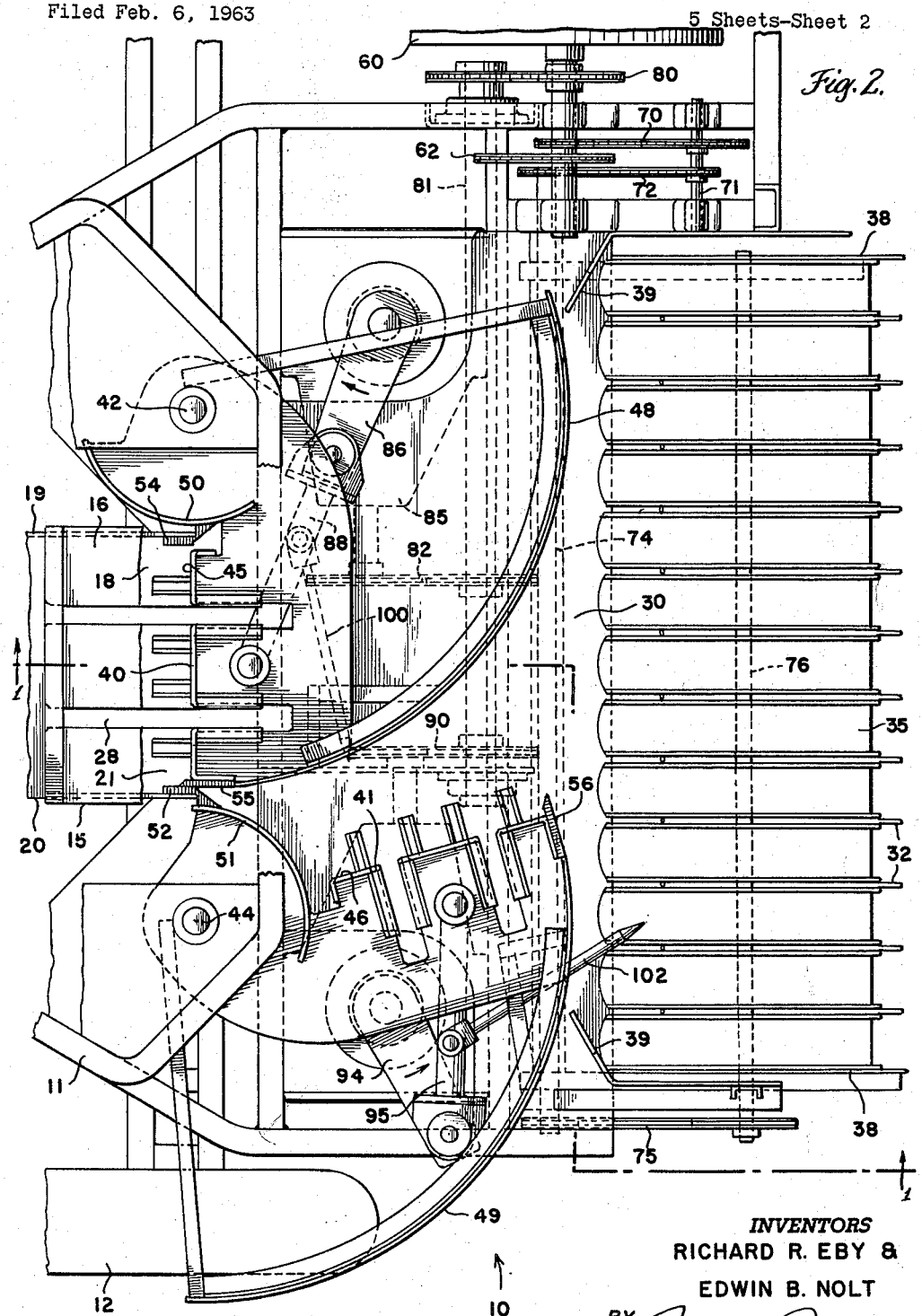

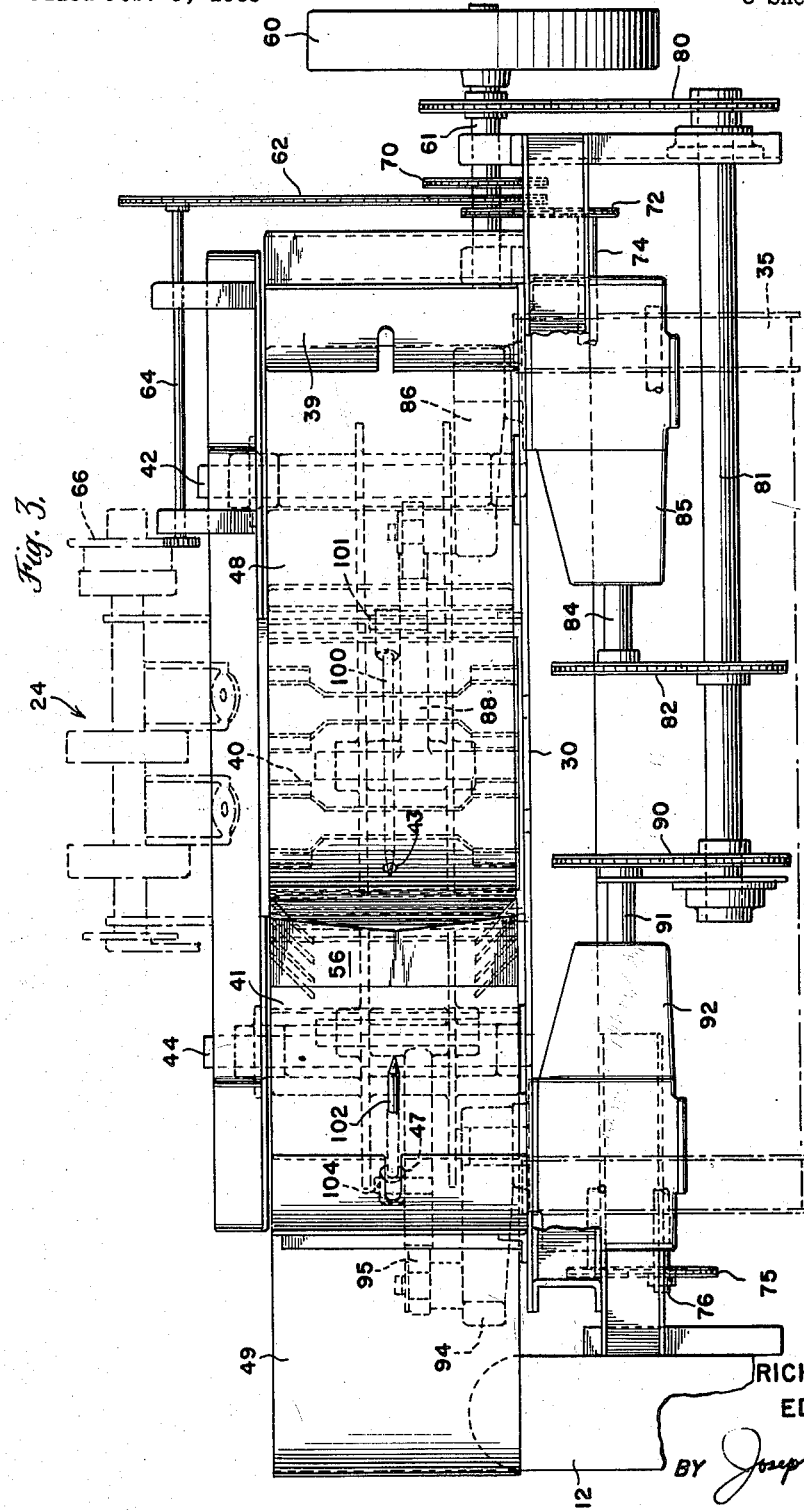

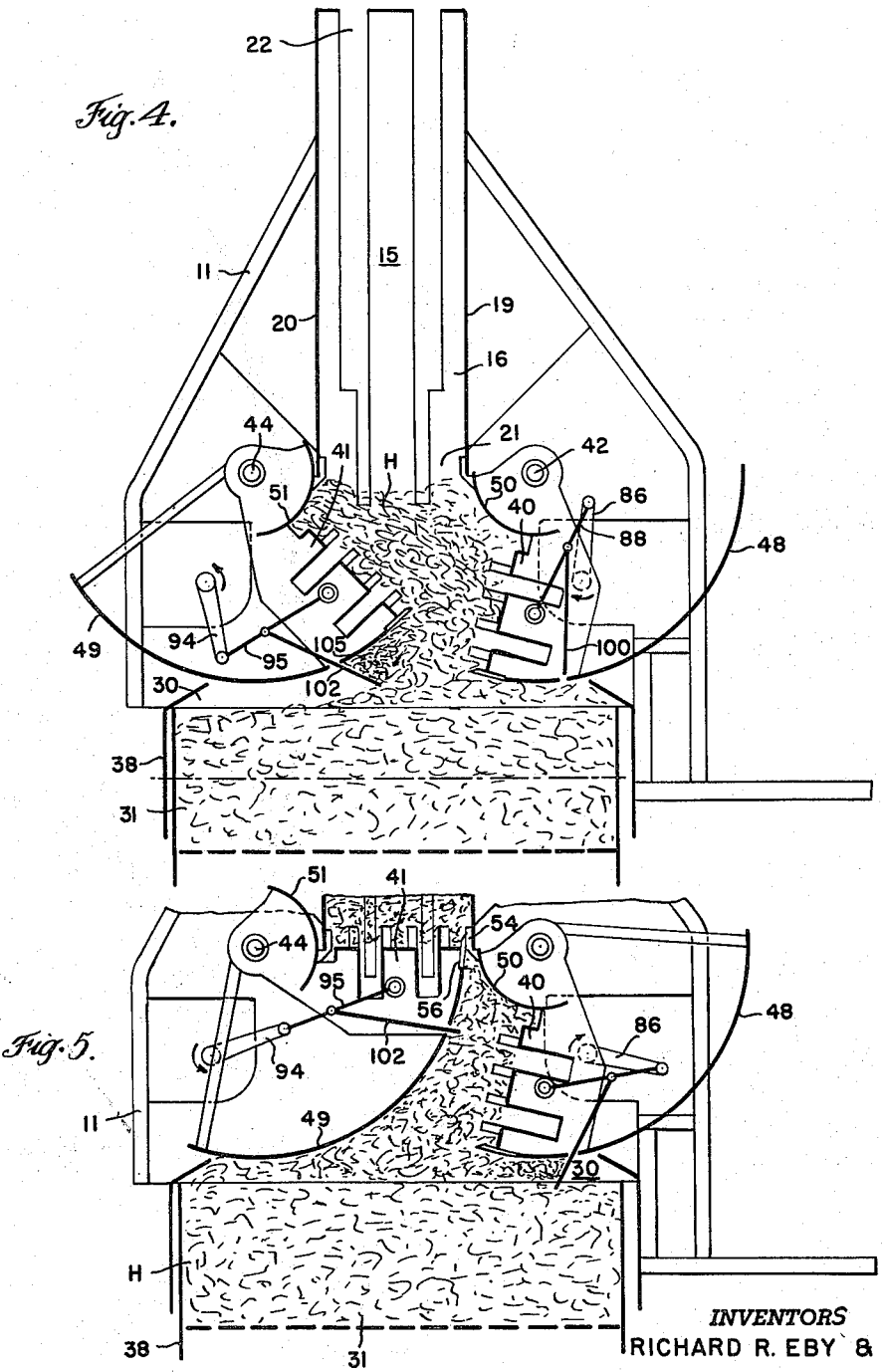

R. R. EBY ETAL 3,174,425

HAY BALER

Filed Feb. 6, 1963

INVENTORS
RICHARD R. EBY &
EDWIN B. NOLT

BY Joseph A. Brown
ATTORNEY 3,174,425
HAY BALER
Richard R. Eby, Ephrata, and Edwin B. Nolt, New Holland, Pa., assignors to Sperry Rand Corporation, New Holland, Pa., a corporation of Delaware
Filed Feb. 6, 1963, Ser. No. 256,576
14 Claims. (Cl. 100—98)

This invention relates generally to hay balers and more particularly to hay balers of the so-called straight-through type.

The conventional hay baler has a bale case which extends fore-and-aft relative to the direction of travel of the baler. A hay receiving platform is located along one side wall of the bale case, such side wall having an infeed opening. A pickup is provided in front of the platform which engages previously cut crop material resting on the ground and elevates the material for deposit on the platform. A feeder mechanism operates over the platform in a transverse direction to convey the hay laterally and into the bale case through the side wall opening. Operative in the bale case and reciprocal in a fore-and-aft direction is a plunger which moves rearwardly of the infeed opening on a working stroke and then retracts to a position forwardly of the opening. The direction in which the hay travels successively changes from rearward to lateral to rearward again. Also, the hay is transferred from the pickup to the feeder and then from the feeder to the baler plunger for compression into bales.

To eliminate direction changes and to simplify the mechanism employed between the hay pickup and the final bale formation, straight-through balers have been provided. In such balers, found mainly in countries outside the United States, hay is fed into a bale case through an infeed opening at one axial end of the bale case. The bale case extends in a fore-and-aft direction relative to ground travel and the infeed opening is directly behind a pickup. Commonly, a single bale forming plunger is provided which swings like a pendulum about a horizontal axis. A suitable feeder movable in the same direction as the extension of the bale case, conveys the hay from the pickup to the plunger between working strokes thereof. In such balers, capacity and bale density are both low by United States standards.

A main object of this invention is to provide a hay baler of the straight-through type, but being adapted to produce high density bales and having a capacity greater than conventional balers.

Another object of this invention is to provide a straight-through baler in which a feeder mechanism per se is wholly eliminated, the hay being deposited on a feed platform and the means used to convey the hay into the bale case and to form it into bales being one and the same.

Another object of this invention is to provide a straight-through baler of the character described in which the bale forming process is substantially continuous and uninterrupted.

Another object of this invention is to provide a straight-through baler of the character described having a bale case which extends parallel to the direction of travel of the baler and having an infeed opening at the forward end thereof, hay being conveyed toward the bale case infeed opening in a substantially continuous stream.

A further object of this invention is to provide a straight-through baler of the character described wherein guard means is provided in conjunction with the bale conveying and forming means to insure proper free flow of material into the bale case.

A further object of this invention is to provide a baler of the character described in which the hay to be baled is pre-compressed as it is conveyed toward the baler bale case.

A still further object of this invention is to provide a straight-through baler of simplified construction, relative to balers of prior design, whereby the baler may be manufactured and sold at a low cost.

Other objects of this invention will be apparent hereinafter from the specification and from the recital in the appended claims.

In the drawings:

FIG. 1 is a vertical section taken generally on the lines 1—1 of FIG. 2 looking in the direction of the arrows and showing a straight-through baler constructed according to this invention;

FIG. 2 is a plan view of the baler;

FIG. 3 is a front elevational view looking toward the left in FIG. 1 and showing the baler tying mechanism and pickup in phantom; and FIGS. 4–7 are generally diagrammatic plan views showing different operative positions of the components of the baler.

Figure 6:
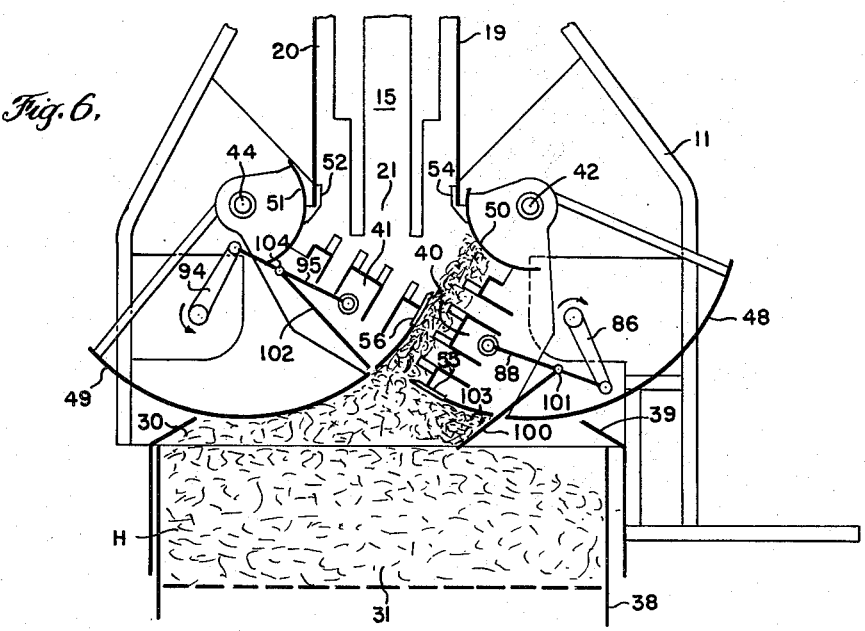
Figure 7:
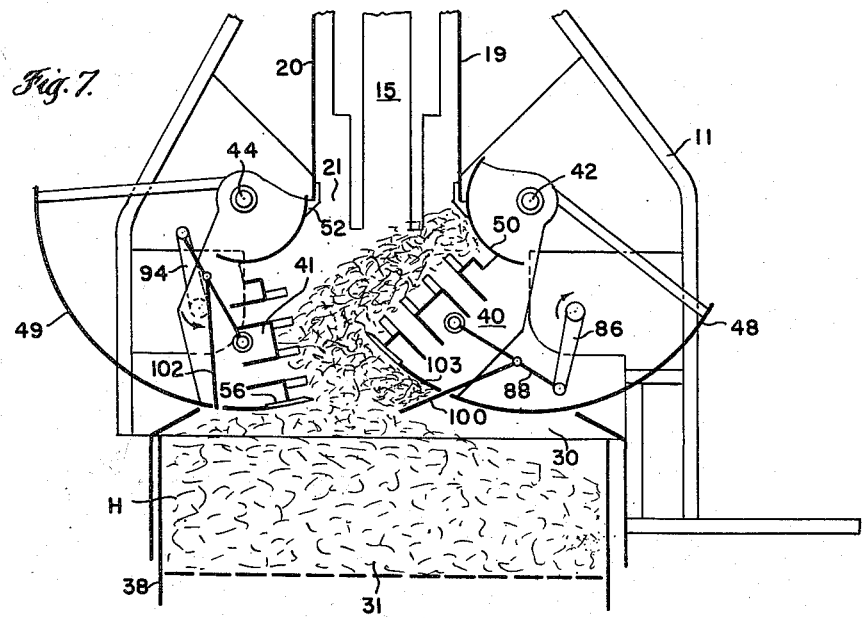

Referring now to the drawings by numerals of reference, and particularly to FIGS. 1–3, 10 denotes generally a straight-through baler having a main frame 11 supported by wheels 12 for ground travel in a forward direction indicated by the arrow 14 in FIG. 1. Connected to frame 11 and extending in a fore-and-aft direction relative to ground travel is an elongated bale case 15 having a top wall 16, a bottom wall 18 and side walls 19 and 20. Bale case 15 is disposed generally horizontally and it has an infeed opening 21 at a forward axial end and a discharge opening 22 at a rearward axial end.

Mounted on top wall 16 adjacent the forward end thereof is a conventional tying mechanism 24. Supported on yoke 25 pivotally carried on side walls 19 and 20 of bale case 15 are needles 26 (FIG. 1) and adapted to be projected from the position shown in FIG. 1 to a location across the bale case to deposit a tying medium in tier 24. The bale case is slotted at 28 for the passage of the needles. This structure is not shown or described in more detail here since it is of the conventional type found on balers.

Mounted on frame 11 directly in front of the infeed opening 21 of bale case 15 and extending forwardly of the bottom wall 18 is a feed platform 30. Platform 30 is disposed horizontally and it projects to opposite sides of the bale case. The platform is adapted to receive hay delivered to it from a rotatable pickup reel 31 mounted in front of the platform. The pickup reel has projecting pickup fingers 32 which travel in a counterclockwise direction when viewed as shown in FIG. 1 to engage and sweep material from the ground 34 and elevate such material over laterally spaced stripper plates 35. The material is then deposited on platform 30. Conventional wind guard rods 36 are provided which extend over the pickup and the elevated crop material is prevented from escaping from the pickup by side plates 38. At the rearward ends of plates 38, inwardly extending guides 39 are provided to cause the crop material to be laterally consolidated as it passes from the pickup and to direct the material toward the infeed opening 21 in the bale case 15. The width of the pickup reel 31 is substantially greater than the width of the bale case 15 and the pickup is so located as to extend equally on opposite sides of the longitudinal axis of the bale case.

For engaging the material on platform 30 and for conveying it into the bale case 15, a pair of oscillatable plungers are provided, namely plungers 40 and 41. Plunger 40 is supported on vertical shaft 42. Shaft 42 is located adjacent side wall 19 of the bale case 15.

Plunger 41 is similarly mounted on a vertical shaft 44 located adjacent side wall 20 of bale case 15. The plungers are oscillatable in timed relation to each other. When plunger 40 moves on a working stroke, plunger 41 retracts and when the plunger 41 moves on a working stroke, plunger 40 retracts. The plungers travel over intersecting but separate arcuate paths. Plunger 40 has a wide front working face 45 having a width and height related to the cross section of the bale case so that when the plunger is projected into the infeed opening 21, the hay delivered into the bale case will be densely compressed. Plunger 41 has a similar front working face 46 which is also related in size and configuration to the cross section of bale case 15.

To prevent hay from getting behind the working faces of the respective plungers during working strokes, the front side of plunger 40 is provided with an arcuate vertically extending guard 48 and the forward side of plunger 41 is provided with a similar guard 49. Each guard comprises a plate which extends from the face of its plunger and then in an arc concentric to the pivot axis of the plunger. A second arcuate guard 50 is provided on plunger 40 opposite guard 48 and extending from face 45 to bale case side wall 19, as shown in FIG. 2. A similar guard 51 is provided on plunger 41 opposite guard 49 and extending from face 46 to bale case side wall 20, also as shown in FIG. 2. The forward edge of the side wall 20 of bale case 15 is provided with a vertically extending shear bar 52 and the forward edge of wall 19 of the bale case has a similar shear bar 54. Plunger 40 carries cutting means in the form of a knife 55 which cooperates with shear bar 52 on bale case wall 20 at the end of a working stroke of plunger 40. Plunger 41 has a cutting means in the form of a knife 56 which is cooperative with the shear bar 54 on bale case wall 19. The knives 55 and 56 sever the hay conveyed into the bale case and form it into separate wads so that when a given bale is completed, it will be separate from the next bale.

For driving the various components of the baler, power is supplied from a suitable source, not shown, to a flywheel 60 carried on a power input shaft 61 journalled on main frame 11 of baler 10. Shaft 61 drives a chain 62 which in turn rotates a shaft 64 connected by chain 65 to tier 24. Normally tier 24 is inoperative; but it is adapted to be triggered through one operating cycle by a conventional one revolution clutch indicated diagrammatically at 66. Shaft 61 also operates through chain 70, shaft 71, chain 72, cross-shaft 74, and chain 75 to operate the shaft 76 of the pickup reel 31. Further, the shaft 61 has a drive chain 80 which drives shaft 81. Shaft 81 operates through chain 82, shaft 84 and gearbox 85 to drive a crank arm 86 connected by link 88 to plunger 40. Shaft 81 also drives a chain 90 to transmit power through shaft 91 and gearbox 92 to drive a crank arm 94 connected by link 95 to plunger 41.

For assisting in the conveyance of hay toward infeed opening 21 of bale case 15, each plunger is provided with feeder means. The plunger 40 has a feed finger 100 pivotally connected at 101 to link 88. Finger 100 projects through slot 43 in guard 48 on a working stroke of plunger 40. The linkage is such that the finger 100 is retracted when plunger 40 is moved on a retracting stroke. Plunger 41 has a similar finger 102 pivotally connected at 104 to link 95. When plunger 41 is moved on a retracting stroke, finger 102 is retracted. However, when plunger 41 moves on a working stroke, finger 102 is extended beyond the guard 49 through slot 47.

*Operation*

As the baler 10 travels in the direction of the arrow 14 in FIG. 1, the pickup reel rotates and engages material resting on the ground 34. The material is elevated and discharged rearwardly to the platform 30. Material H is deposited on platform 30 in a substantially continuous stream and it is continuously removed therefrom by the plungers 40 and 41 oscillating about their respective vertical shafts 42 and 44.

The plungers operate alternately. In FIG. 2, plunger 40 is shown at the end of a working stroke, with the working face 45 of the plunger projected into the end opening 21 of bale case 15. The knife 55 on the plunger is in operative cutting relation to shear bar 52. Finger 100 is retracted and plunger 41 is just starting to move on a working stroke. As it travels toward bale case 15, plunger 41 directs hay toward guard 48 on plunger 40. This produces a pre-compression of the hay between face 46 of plunger 41 and guard 48.

When plunger 41 sweeps toward bale case 15 and after plunger 40 has retracted from the path of plunger 41, FIG. 4, the hay in front of face 46 is forced into the bale case. At the same time, finger 102 conveys hay portion 105 in front of plunger 40. At the end of a working stroke, FIG. 5, plunger 41 projects into bale case 15 and knife 56 operatively engages shear bar 54. The cutting action thus provided separates the hay forced into the bale case from the hay on platform 30. On the next working stroke of plunger 40, the hay directly in front of face 45 is pre-compressed against guard 49, FIG. 6. Finger 100 projects outwardly of guard 48 and conveys hay portion 103 for deposit in front of plunger 41. The plunger will engage portion 103 on its next compression stroke.

With this infeed construction, the plungers which compress the hay into bales also serve as the conveying means for moving material across platform 30 and into bale case 15. The fingers 100 and 102 are physically carried on the plungers and operate as assist devices to move up charges of hay for the next working strokes. When the plunger 40 is moving on a working stroke, the plunger 41 is retracting, and in like respect when the plunger 41 moves toward the bale case, the plunger 40 is retracting. Thus, the conveyance of hay from platform 30 and into bale case 15 is substantially continuous.

In a feeding stroke, the plunger 40 tends to direct hay toward the side wall 20 of the bale case 15 while the plunger 41 tends to direct hay toward the side wall 19. This is a desirable characteristic since it produces a uniform lateral distribution of hay in the bale case. When operated at high oscillating speeds, the alternately operating plungers are able to handle a large quantity of hay and produce bales of high density. The resulting bales are similar to those produced by a conventional baler. Since the longitudinal axis of the bale case 15 is parallel to the direction of travel of the baler and on the medial longitudinal line of operation thereof, the hay is picked up and delivered directly rearwardly as it is formed into bales. No changes in direction in the travel of the hay is provided or required. Since a feeder mechanism per se is wholly eliminated, and since the two plungers perform the dual task of conveying and compressing, the overall structure required is less than in a conventional baler with a resultant lessening of cost in manufacture.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. A hay baler comprising a wheel supported frame adapted to travel in a forward direction, an elongated bale case carried on said frame and extending longitudinally thereof, said bale case having a top wall, a bottom wall, a pair of side walls, an infeed opening at a forward axial end and a discharge opening at a rearward axial end, a hay receiving platform mounted on said frame in front of said bale case infeed opening and extending forwardly of said bottom wall, a pair of cooperative plungers, means pivotally supporting one of said plungers on said frame adjacent one bale case side wall for oscillating movement about an axis extending in a vertical direction, means pivotally supporting the other of said plungers on said frame adjacent the other bale case side wall for oscillating movement about an axis extending in a vertical direction, drive means oscillating said plungers in timed relation to each other, each of said plungers being movable from a retracted position forwardly and laterally of said infeed opening to a rearward position at the infeed opening of said bale case, cutting means operatively associated with said plungers for severing hay into separate wads, each of said plungers having a broad hay engageable front face related in size in a vertical direction to said bale case infeed opening and extending substantially from said top wall to said bottom wall when projected into said bale case.

2. A hay baler as recited in claim 1 wherein said plungers operate alternately, one plunger then the other moving hay across said platform and into said bale case, the face of each plunger having a width related to the bale case size and extending substantially from one side wall to the other.

3. A hay baler as recited in claim 2 wherein said cutting means comprises a shear bar on each bale case side wall and extending vertically at said infeed opening, a knife on said one plunger cooperating with the shear bar on the other bale case side wall and a knife on said other plunger cooperating with the shear bar on the one bale case side wall.

4. A hay baler as recited in claim 1 wherein each plunger has a guard associated therewith to prevent hay from entering behind the plunger during a working stroke thereof, one plunger pre-compressing hay against the guard of the other plunger and then the other plunger pre-compressing hay against the guard of the one plunger during operation of the baler.

5. A hay baler as recited in claim 4 wherein each guard is arcuate and concentric to the axis about which its associated plunger oscillates.

6. A hay baler as recited in claim 1 wherein said one plunger oscillates in a given arc and said other plunger oscillates in a different arc, feeder means being carried on each plunger and engageable with hay outside the arcs of travel of the plungers to convey the hay toward said infeed opening.

7. A hay baler as recited in claim 6 wherein said feeder means comprises feed fingers, and means operatively connected between said plungers and the feed fingers to project the fingers beyond the plunger arcs on working strokes of the plungers and to retract the fingers when the plungers are returning.

8. A hay baler as recited in claim 7 wherein said feed fingers are located behind the plungers on working strokes and projectable forwardly of the plunger arcs of travel.

9. A hay baler as recited in claim 7 wherein each plunger has an arcuate guard extending from the plunger face and preventing hay from getting behind the face on a working stroke of the plunger, each guard having slots through which said feed fingers are projectable and retractable.

10. A hay baler comprising an elongated bale case extending in a horizontal direction and having a top wall, a bottom wall, a pair of side walls and an infeed opening at one axial end thereof, a shear bar on one of said side walls, a shear bar on the other of said side walls, a hay receiving platform in front of said opening and extending outwardly from said bale case bottom wall, a pair of plungers arcuately movable over said platform and each having a broad front face to sweep hay into said bale case through said opening and to compress the hay into bales, means supporting one of said plungers adjacent one of said side walls, means supporting the other of said plungers adjacent the other of said side walls, a knife on said one plunger cooperative with said shear bar on said other side wall, a knife on said other plunger and cooperative with said shear bar on said one side wall, and drive means oscillating said plungers in timed relation to each other, one plunger then the other moving hay toward said bale case opening, said pair of plungers being oscillatable about axes extending in a vertical direction.

11. A hay baler as recited in claim 10 wherein each plunger has a broad working face related in size to said bale case and each plunger being projectable into the bale case between said top, bottom and side walls and substantially traversing the space between the walls.

12. A hay baler as recited in claim 11 wherein each plunger has a pair of vertically extending guards, one guard extending from the working face of the plunger along one side thereof toward said bale case and the other guard extending from the working face of the plunger along the opposite side thereof and away from the bale case.

13. A hay baler as recited in claim 12 wherein both of said guards are arcuate and concentric to the axis of oscillation of its associated plunger, said one guard being closer to the axis than said other guard.

14. A hay baler comprising an elongated bale case extending in a horizontal direction and having a top wall, a bottom wall, a pair of side walls and an infeed opening at one axial end thereof, a hay receiving platform in front of said opening and extending outwardly from said bale case bottom wall, a pair of plungers each having a broad front face movable over said platform to sweep hay into said bale case through said opening and to compress the hay into bales, means supporting one of said plungers adjacent one of said side walls, means supporting the other of said plungers adjacent the other of said side walls, said pair of plungers being oscillatable about axes extending in a vertical direction, drive means for operating said plungers in timed relation to each other, and cutting means carried on the plungers to sever hay conveyed into said bale case into separate wads.

References Cited by the Examiner

UNITED STATES PATENTS

| | | | |
|---|---|---|---|
| 165,252 | 7/75 | Pike. | |
| 1,306,064 | 6/19 | Joy | 198—10 |
| 1,467,700 | 9/23 | Wilson | 198—10 |
| 2,727,457 | 12/55 | Hedtke | 100—98 X |
| 2,917,993 | 12/59 | Nikkel | 100—142 |

FOREIGN PATENTS

| | | |
|---|---|---|
| 30,009 | 12/10 | Sweden. |
| 614,219 | 6/35 | Germany. |
| 623,051 | 12/35 | Germany. |
| 968,489 | 4/50 | France. |

WALTER A. SCHEEL, *Primary Examiner.*